United States Patent [19]

Eggebrecht et al.

[11] Patent Number: 4,658,350

[45] Date of Patent: Apr. 14, 1987

[54] EXTENDED ADDRESSING APPARATUS AND METHOD FOR DIRECT STORAGE ACCESS DEVICES

[75] Inventors: Lewis C. Eggebrecht, Rochester, Minn.; David A. Kummer, Boca Raton, Fla.

[73] Assignee: International Business Machines Corp., Armonk, N.Y.

[21] Appl. No.: 493,134

[22] PCT Filed: Aug. 12, 1981

[86] PCT No.: PCT/US81/01078

§ 371 Date: Mar. 31, 1983

§ 102(e) Date: Mar. 31, 1983

[87] PCT Pub. No.: WO83/00576

PCT Pub. Date: Feb. 17, 1983

[51] Int. Cl.[4] .............................................. G06F 13/00

[52] U.S. Cl. .................................................... 364/200

[58] Field of Search ... 364/200 MS File, 900 MS File

[56] References Cited

U.S. PATENT DOCUMENTS 3,462,744 9/1966 Tomasulo et al. .................. 364/200
3,573,851 4/1971 Watson et al. ...................... 364/200
3,976,976 8/1976 Khosharian ......................... 364/200
4,037,211 7/1977 Ikuta et al. .......................... 364/200
4,060,846 11/1977 Bienvenu et al. ................... 364/200
4,092,715 5/1978 Scriver ............................... 364/200
4,173,783 11/1979 Coulear et al. ..................... 364/200
4,307,448 12/1981 Sattler ................................ 364/200
4,374,417 2/1983 Bradley et al. ...................... 364/200
4,403,283 9/1983 Myntti et al. ....................... 364/200
4,443,847 4/1984 Bradley et al. ..................... 364/200
4,481,570 11/1984 Wiker ................................ 364/200
4,500,962 2/1985 Lemaire et al. ..................... 364/200

OTHER PUBLICATIONS

IBM Tech. Discl. Bull. vol. 19, No. 1, Jun. 1976, "Address Translation for Dual-Program Processor", Dennison et al.

*Primary Examiner*—Eddie P. Chan
*Attorney, Agent, or Firm*—Shelley M. Beckstrand; Robert Lieber

[57] ABSTRACT

A computing system storage addressing apparatus which extends the addressing capability of an address bus to enable direct storage (memory) storage access (DMA) channels to operate simultaneously in the same or different storage page. The computing system includes a processor, a plurality of storage devices, a data bus and an address bus interconnecting the processor and the storage devices, a DMA device controlling connection of a plurality of DMA channels to the address bus and data bus, a plurality of address register means for storing page address signals loaded from the processor, and gating means for gating to the address bus page address signals from an address register means corresponding to a currently active DMA channel.

4 Claims, 5 Drawing Figures

EXTENDED ADDRESSING APPARATUS AND METHOD FOR DIRECT STORAGE ACCESS DEVICES

BACKGROUND OF THE INVENTION

1. Field of the Invention

This invention relates to storage addressing and, more particularly, to apparatus and method for controlling access to the same or different pages of storage by a plurality of direct storage (memory) access (DMA) channels.

2. Discussion of the Prior Art

This invention is an improvement on that of U.S. patent application Ser. No. 231,653, now U.S. Pat. No. 4,443,847 filed Feb. 5, 1981 for PAGE ADDRESSING MECHANISM by D. J. Bradley et al, and on that of U.S. patent application Ser. No. 231,639, now U.S. Pat. No. 4,374,417 filed Feb. 5, 1981 for METHOD FOR USING PAGE ADDRESSING MECHANISM by D. J. Bradley et al, both of common assignee. Since the filing of the present application, patents have been granted for the foregoing Bradley et al. patent applications: U.S. Pat. No. 4,443,847 for application Ser. No. 231,653 and U.S. Pat. No. 4,374,417 for the application Ser. No. 231,639.

The Bradley references extend the size of memory which can be addressed by an address bus carrying N bits of information from the normal $2^N$ locations to a multiple of $2^N$ by providing a plurality of register means each of which is separately programmable to store data capable of being selectably provided as page signals. Selection of the page registers is made by control signals manifesting the then occurring storage operation, such as instruction fetch, storage read, or storage write operations. However, the Bradley addressing technique suffers in a system where there exists a plurality of direct storage (or memory) access channels (DMA). All DMA channels which can operate simultaneously must be directed to the same extended region of the storage address space. This may result in the necessity for double buffering of data, which reduces system performance and increases storage requirements.

SUMMARY OF THE INVENTION

In accordance with a preferred embodiment of this invention, there is provided an improvement in a computing system storage addressing apparatus which extends the addressing capability of an address bus to enable direct storage (memory) access (DMA) channels to operate simultaneously in either the same storage page or different storage pages. Accordingly, there is provided in a computing system including a processor, a plurality of storage devices, a data bus and an address bus interconnecting said processor and said storage devices, and a DMA device controlling connection of a plurality of DMA channels to the address bus and data bus, a plurality of address register means for storing page address signals loaded from the processor, and gating means for gating to the address bus page address signals from the address register means corresponding to a currently active DMA channel.

BRIEF DESCRIPTION OF THE DRAWINGS

One preferred embodiment of this invention is hereinafter described with reference being made to the following drawings in which.

DESCRIPTION OF THE PREFERRED EMBODIMENTS

Figure 1:
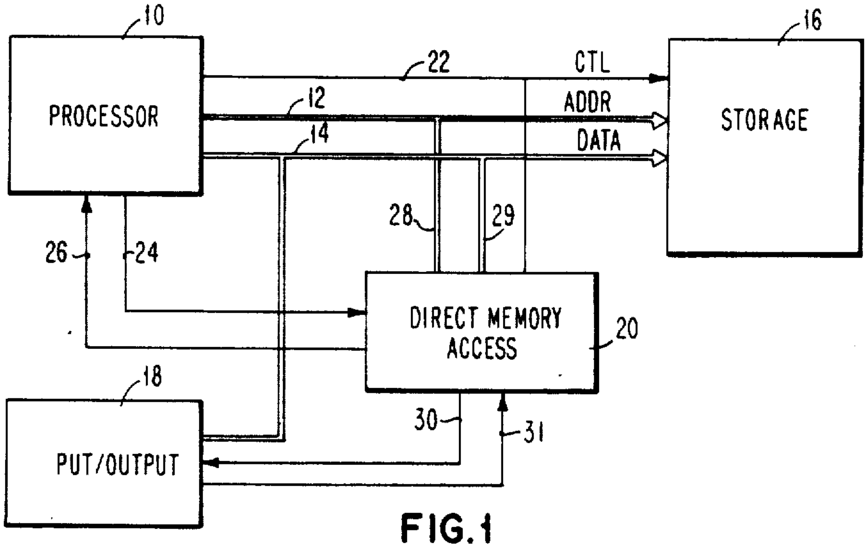
FIG. 1 is a block diagram showing a typical DMA apparatus for addressing DMA channels to system storage.

Herein, by way of example, processor unit 10 comprises an Intel 8088 microprocessor with a twenty bit address bus 12 capable of addressing in excess of one million locations in storage 16, and an 8 bit data bus 14. Storage 16 may comprise standard read only storage and random access memory devices.

Input/output devices 18 are coupled to data bus 14 for transferring data with respect to storage 16 under control of DMA controller 20. DMA controller 20 herein comprises an Intel 8237 or Intel DMA 8257 device with a capacity for coupling four channels (one is illustrated) to the eight bit data bus 14. DMA 20 address lines 28 couple sixteen address bits to the twenty bit address bus 12.

In the simplified diagram of FIG. 1, line 22 represents the many control and status lines to be described hereafter for controlling the activity on busses 12, 14. Control lines interconnecting processor 10 and DMA 20 to be specifically mentioned at this point include bus request (also referred to as HOLD) line 26 and bus grant (also referred to as HOLD A) line 24. Control lines interconnecting DMA to a single input/output means (such as a plurality of I/O devices attached to an I/O adapter 18), and thus establishing a given instance of a channel, include data request (DRQ) line 31 and data acknowledge (DACK) line 30. A DRQ/DACK line pair exists for each channel.

In operation, approximately one typical bus cycle under DMA control includes the following steps:

(1) Processor 10 communicates address information over data busses 14, 29 to DMA 20, where it is stored in the DMA 20 address register addressed by the four low order bits A0–A3 on address bus 12, indicating the location in storage 16, with respect to which data is to be transferred.

(2) Processor 10 communicates count information to DMA 20 over data busses 14, 29, where it is stored in the count register addressed by the four low order bits A0–A3 on the address bus 12, indicating the number of words or characters to be transferred.

(3) I/O controller 18, when ready to transfer, brings up data request (DRQ) line 31.

(4) Responding to DRQ 31, DMA 20 signals HOLD 26 to processor 10 to request access to busses 12, 14.

(5) Responding to HOLD 26, processor 10 signals HOLD A 24 to DMA 20, granting access to busses 12, 14.

(6) DMA 20, now controlling system busses 12, 14, loads address bus 12 with the address stored at step (1) in the DMA 20 address register for the currently active channel.

(7) DMA 20 signals DACK 30 to I/O controller 18.

(8) I/O controller 18 loads its data on data bus 14.

(9) DMA 20 controls selected control (CTL) lines 22 to indicate storage work to be performed.

(10) DMA 20 releases the system busses.

Figure 3B:
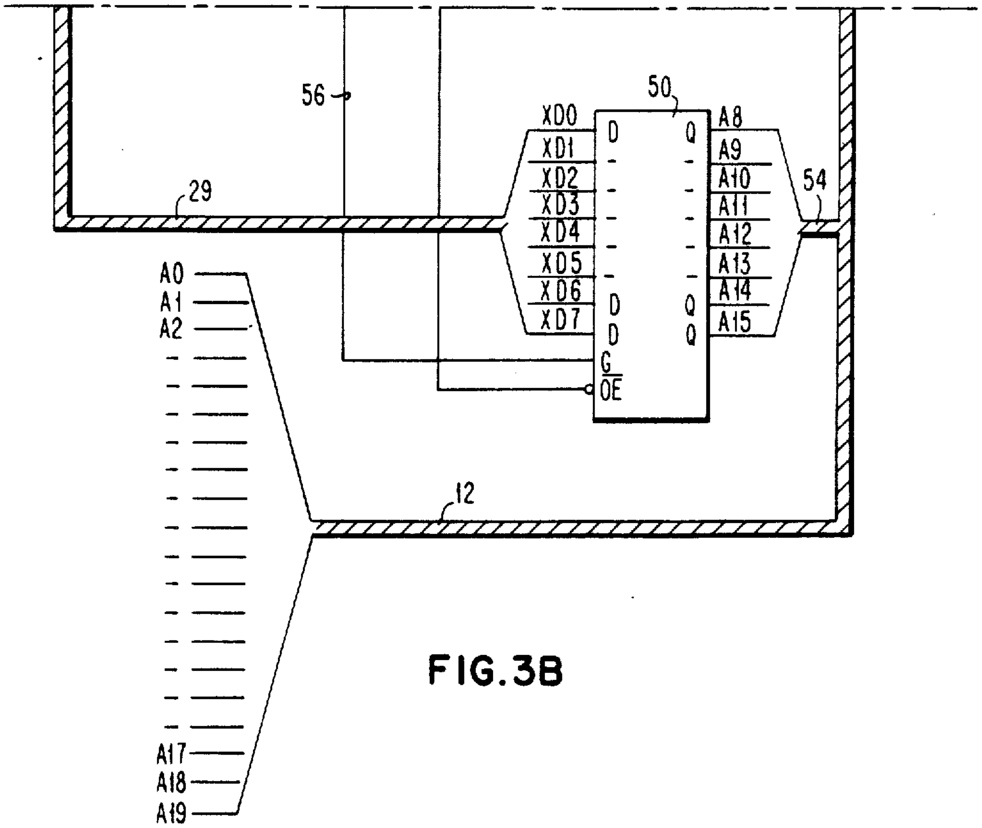
FIGS. 3A and 3B are block diagrams showing the bus and addressing apparatus of FIG. 2 in greater detail; these are aligned as shown in FIG. 3.
Figure 3:
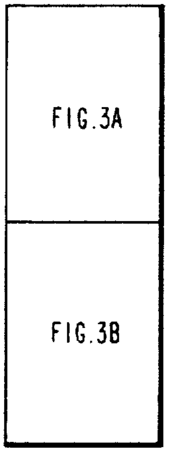
Figure 3A:
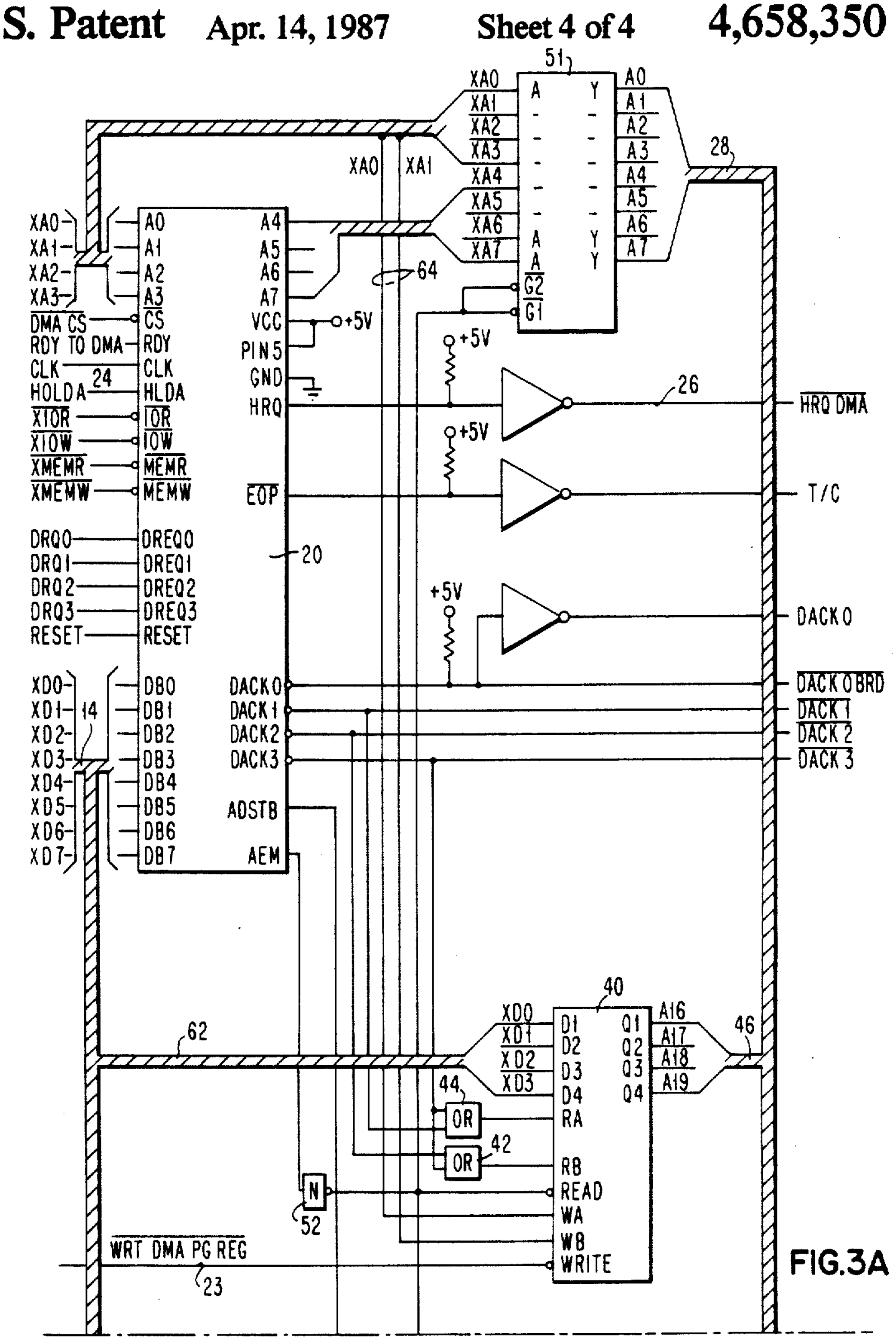

A DMA operation typically includes transfer of a plurality of data characters (a character is 8 bits for the 8 bit data bus in this example), and includes the following steps:

(1) load address on address bus 12 from the DMA 20 address register corresponding to the active channel;

(2) perform bus operation (data transfer over bus 14);

(3) increment (or, equivalently, decrement) DMA 20 address register;

(4) decrement the DMA 20 count register corresponding to the active channel;

(5) repeat steps (1)–(4) until the cunt register reaches zero;

(6) signal end of operation (see FIG. 3A, pin EOP).

Figure 2:
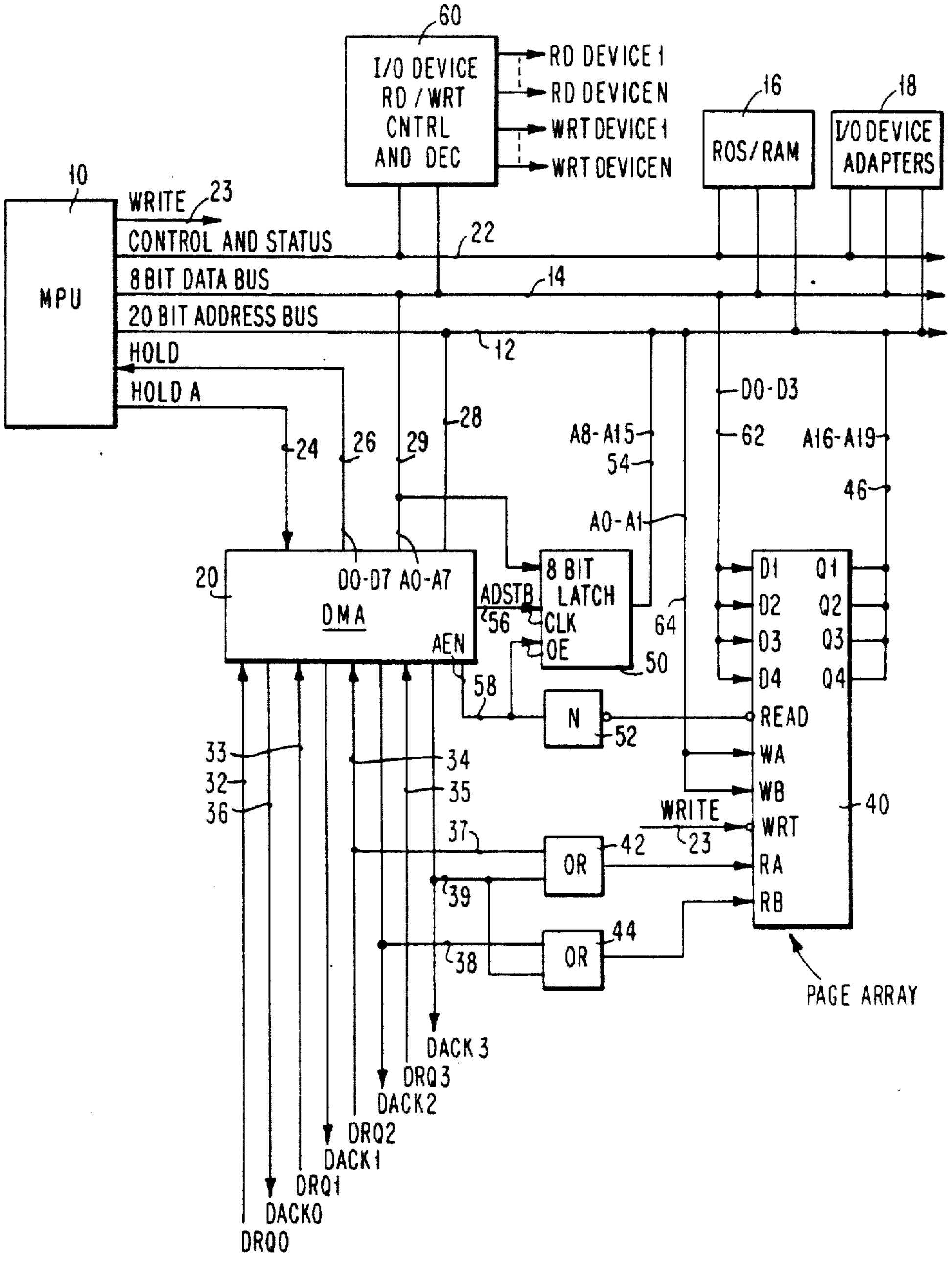
FIG. 2 is a block diagram showing the apparatus of the invention for addressing a plurality of DMA channels into the same or distinct regions of system storage.

Referring now to FIG. 2, a description will be given of the addressing apparatus of the invention. In FIG. 2 there is provided, by way of example and not limitation, apparatus for controlling four DMA channels and for paging each DMA channel into selectable pages of $2^{16}$, or approximately 64K, addressable locations within an address space comprising $2^{20}$, or approximately one million such locations. This particular example results from the combination of a twenty bit system address bus 12, with a four channel DMA chip 20 having 16 address lines 28, 29, and a four bit page array register 40, as will be further described hereafter.

As shown in FIG. 2, processor chip 10 includes among its input/output lines an 8 bit data bus 14, a 20 bit address bus 12, a plurality of control and status lines 22, write control line 23, hold acknowledge line 24, and hold line 26. Control and status lines are coupled to I/O device read/write control and decode module 60, storage 16, and I/O device adapters 18. Eight bit data bus 14 is coupled to storage 16, adapters 18, via lines 29 to the eight data ports D0–D7 of DMA 20, and via the four (D0–D3) lines 62 to the data input terminals D1, D2, D3 and D4 of page array 40. The eight lines 29 from DMA 20 may be used for either data or address, and in the latter case are gated by AEN line 58 and ADSTB line 56 through 8 bit latch 50 via lines 54 to provide address bits A8–A15 to address bus 12. DMA 20 address bits A0–A7 are coupled (through buffer 51 shown in FIG. 3) by lines 28 to address bus 12. Address bus 12 is also coupled to control and decode 60, storage 16, device adapters 18, and the two low order bits (A0, A1) to the WA and WB input terminals of page array chip 40.

The output of I/O device read/write control and decoder is a read-device/write-device line pair for each of the attached devices.

Write control line 23 of processor 10 is coupled to the WRITE terminal (WRT) of page array register 40. Address enable (AEN) line 58 indicates that DMA has control of the system busses 12, 14, and in this exemplary implementation is fed from the AEN terminal of DMA 20 to the OE terminal of latch 50, and via inverter 52 to the READ terminal of page array register 40. The address strobe (ADSTB) terminal of DMA 20 is coupled to the clock CLK terminal of latch 50 by line 56, and becomes active to latch information on lines 29 into latch 50.

Device acknowledge DACK 1 line 37, DACK 2 line 38, DACK 3 line 39 are encoded by OR array 42, 44 and fed to the read A (RA) and read B (RB) input terminals of page array 40. Device request DRQ 0 line 32, DRQ 1 line 33, DRQ 2 line 34, and DRQ 3 line 35, together with lines 36–38 couple DMA 20 to I/O device adapters 18, with a DRQ/DACK pair for each DMA channel.

Page array 40 output terminals Q1–Q4 are coupled to the A16–A19 bits of address bus 12 by lines 46.

In this example, page array 40 comprises a Texas Instruments standard TTL circuit type 74LS670 module latch 50 a standard TTL circuit type LS373, buffer 51 (FIG. 3) a standard TTL circuit type LS244, DMA 20 an Intel 8237 (or, equivalently, an Intel 8257) DMA device.

In FIG. 3 is shown in greater detail the interconnection of DMA 20, page array 40, 8 bit latch 50 (all from FIG. 2) and buffer 51 which buffers address bits A0–A7 from DMA 20 onto lines 28 and address bus 12. As illustrated in FIG. 3, DMA chip 20 comprises 40 terminal pins, the pertinent pins including address bits A0–A7, combined data/address pins DB0–DB7, data request pins DREQ0–DREQ3, data acknowledge pins DACK0–DACK3, bus (or hold HOLD) request pin HRQ26, ADSTB pin 56, address enable AEN pin 58, and group of control pins from processor 10 including chip select CS, hold acknowledge HLDA 24, I/O read pin IOR, and I/O write pin IOW.

In operation, the apparatus of FIGS. 2 and 3 extends the addressing capability of DMA 20 from the 16 bits provided by an Intel 8237 DMA chip to the full 20 bits system address bus provided by an Intel 8088 microprocessor chip (such as is described in A. P. Morse, *The 8086 Primer*, Hayden Book Co., Inc., copyright 1980, Library of Congress number QA76.8.1292M67001.6'4'04 79-23932 SBN 0-8104-5165-4) by selecting a pre-programmed page register for each separate DMA channel. Thus, simultaneous DMA operations can take place in the same or different 64K byte block regions, or pages.

Page array 40 includes four four-bit registers, each of which is individually programmable by processor 10 to provide different or identical high order address bits A16–A19 at output terminals Q1–Q4. To program one of these array 40 registers, the register address (00, 01, 10, or 11) is established at the WA, WB terminals, the data bus 14 bits D0–D3 are applied to array 40 terminals D1–D4 respectively, and loaded into the addressed register when WRITE 23 is activated.

When a specific channel is requested by an I/O device 18 on a DRQ line, DMA 20 indicates that this channel is active by sending a DACK signal unique to that channel and by activating the address enable AEN line 58 signalling that any channel is active. In order to gate address bits A16–A19 from one of array 40 registers to thereby establish the storage 16 page in which the active channel is to operate, DACK lines 37–39 are encoded at gates 42, 44 to provide at array 40 read address input terminals RA, RB the address of the array 40 register corresponding to the active DMA channel. When the array 40 READ terminal is activated by DMA 20 signal AEN on line 58, the contents of the array 40 register selected by RA, RB is placed at array 40 terminals Q1–Q4 to load the high order address bits A16–A19 on address bus 12. The remaining, low order 16 address bits A0–A15 are loaded onto address bus 12 by buffer 51 (bits A0–A7) and latch 50 (bits A8–A15) respectively, which receive their address bits from DMA 20.

DMA 20 is primed with the 16 low order address bits by controller 10 via data bus 14, as was described in connection with FIG. 1.

Figure 4:
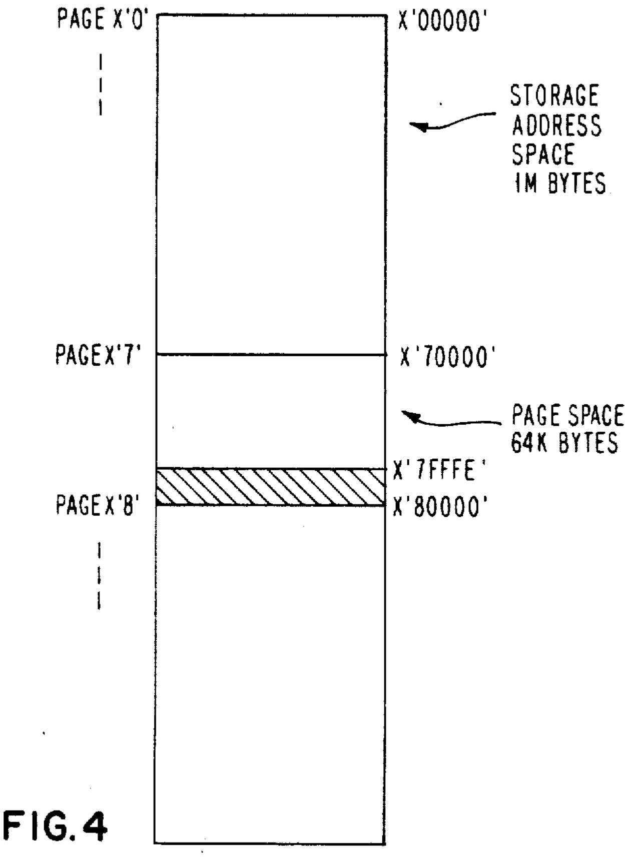
FIG. 4 is a map diagram of storage address space illustrating DMA page rollover.

In Table 1 is set forth a source code listing in Intel ASM-86 assembly language (as described in *Morse*, supra) illustrating an example of the addressing technique of the invention, together with one approach for preventing rollover with DMA paging. Referring to FIG. 4, to illustrate paging and rollover, assume that the high order address bits stored in the array register 40 for an active DMA channel are 0111, or hex 7; that the low order address bits stored in DMA 20 are 1111 1111 1111 1110, or hex FFFE. Assume further that a data transfer is initiated which will write into more than two storage 16 locations. After location 7FFFE and 7FFFF have been written, because there is no carry provided from address bit A15 to A16, the next storage 16 location to receive data will be 70000, and not 80000 as would normally be desired. Consequently, the procedure of Table 1 illustrates steps 1 and 2 of the sequence described above in connection with FIG. 1, as adapted to the apparatus of FIGS. 2 and 3, to prime DMA 20 with the beginning address for, and the count of, a data transfer.

TABLE 1

DMA SET-UP

```
Line SOURCE
611
612    DMA_SETTUP
613                THIS ROUTINE SETS UP THE DMA FOR READ/WRITE/VERIFY
614                OPERATIONS.
615    INPUT
616                (AL) = MODE BYTE FOR THE DMA
617                (ES:BX) - ADDRESS TO READ/WRITE THE DATA
618    OUTPUT
619                (AX) DESTROYED
620
621
622  DMA_SETUP           PROC    NEAR
623                PUSH  CX                ; SAVE THE REGISTER
624                OUT   DMA+12,AL         ; SET THE FIRST/LAST F/F
625                OUT   DMA+11,AL         ; OUTPUT THE MODE BYTE
626                MOV   AX,ES             ; GET THE ES VALUE
627                MOV   CL,4              ; SHIFT COUNT
628                ROL   AX,CL             ; ROTATE LEFT
629                MOV   CH,AL             ; GET HIGHEST NYBLE OF ES TO CH
630                AND   AL,0F0H           ; ZERO THE LOW NYBBLE FROM SEGMNT
631                ADD   AX,EX             ; TEST FOR CARRY FROM ADDITION
632                JNC   SKIP_INC
633                INC   CH                ; CARRY MEANS HIGH 4 BITS MUST BE
634  SKIP_INC:                             ; INC
635                PUSH  AX                ; SAVE START ADDRESS
636                OUT   DMA+4,AL          ; OUTPUT LOW ADDRESS
637                MOV   AL,AH
638                OUT   DMA+4,AL          ; OUTPUT HIGH ADDRESS
639                MOV   AL,CH             ; GET HIGH 4 BITS
640                AND   AL,0FH
641                OUT   DMA_HIGH,AL       ; OUTPUT THE HIGH 4 BITS
642
643  ;------        DETERMINE COUNT
644
645                MOV   AH,DH             ; NUMBER OF SECTORS
646                SUS   AL,AL             ; TIMES 256 INTO AX
647                SHR   AX,F1             ; SECTORS * 128 INTO AX
648                PUSH  AX
649                MOV   BX,6              ; GET THE BYTES/SECTOR PARM
650                CALL  GET_PARM
651                MOV   CL,AH             ; USE AS SHIFT COUNT (0=123,
652                POP   AX                ; 1=256 ETC)
653                SHL   AX,CL             ; MULTIPLY BY CORRECT AMOUNT
654                DEC   AX                ; -1 FOR DMA VALUE
655                PUSH  AX                ; SAVE COUNT VALUE
656                OUT   DMA+5,AL          ; LOW BYTE OF COUNT
657                MOV   AL,AH
658                OUT   DMA+5,AL          ; HIGH BYTE OF COUNT
659                POP   CX                ; RECOVER COUNT VALUE
660                POP   AX                ; RECOVER ADDRESS VALUE
661                ADD   AX,CX             ; ADD, TEST FOR 64K OVERFLOW
662                POP   CX                ; RECOVER REGISTER
663                MOV   AL,2              ; MODE FOR 8237
664                OUT   DMA+10,AL         ; INITIALIZE THE DISKETTE CHANNEL
665                RET                     ; RETURN TO CALLER, CFL SET BY
666  DMA_SETUP           ENDP              ; ABOVE IF ERROR
667 +1 $EJECT
```

In table 1, at lines 624–625 the read/write mode is selected; at lines 626–634 the twenty bit system address is formed from the ES and BX registers; at lines 636–638 the low order 16 bits are loaded to DMA 20; at lines 639–641 the high order 4 bits are loaded to a page register 40; and at line 661 a test is made to assure that rollover will not occur. (In the Intel 8088, a twenty bit address is generated from the two 16-bit ES and BX registers by offsetting the two registers by one four bit nybble and adding the offset registers, as is illustrated in Table 2.)

TABLE 2

| TWENTY BIT ADDRESS FORMULATION | |
|---|---|
| ES | 16 bits |
| BX | 16 bits |
| ADDR | 20 bits |

What is claimed is:

1. Apparatus of the type including an addressable memory, a processor, peripheral device, direct memory access (DMA) control means, a data bus coupled to said processor, said DMA control means, said devices, and said memory, and an address bus for transferring addresses from said processor to said memory, said DMA control means connected to said devices and buses for controlling transfers of data between said memory and said devices, said DMA control means having a plurality of DMA channels for enabling said channels to operate concurrently relative to either the same or different page address spaces of said memory for transferring data concurrently between said spaces and said devices, said address bus having discretely separate first and second portions for conveying partial address information to said memory, said apparatus comprising:

means connecting said DMA control means with said first portion of said address bus;

a plurality of programmable page address registers, one for each of said DMA channels, coupled between said DMA control means and said second portion of said address bus, for storing page addresses representing portions of said memory assigned to respective said channels; and gating means controlled by said DMA control means when one of said DMA channels requires access to said memory for simultaneously gating a partial address signal from said DMA control means to said first portion of said address bus and a page address signal from the register associated with said channel to said second portion of said address bus; said partial address and page address being gated to said memory via said address bus and representing in combination a complete address assigned to said one channel.

2. Apparatus of the type including a processor, a memory addressable by N-bit address words, a data bus for transferring data between said memory and said processor, an address bus for transferring N-bit address words from said processor to said memory, a plurality of peripheral devices linked to said buses, and direct memory access (DMA) control means connected to both of said buses for controlling transfers of data between said memory and said devices, said DMA control means having a plurality of selectively operable DMA channels for enabling said channels to operate concurrently relative to either the same or different page address spaces of said memory for transferring data concurrently between said spaces and said devices, said apparatus characterized by:

said address bus containing a first portion for conveying M-bit partial address terms to said memory (M<N) and a second portion for conveying N-M bit partial address terms to said memory;

access control means for controlling access to said memory by said plurality of channels, said access control means including (a) a plurality of first address register means, one for each DMA channel, for storing from the associated DMA channel a plurality of M-bit partial addresses, and (b) signalling means linking said processor and DMA control means, including means for signalling requests to access said buses by said channels, each such request indicating the identity of the requesting channel, and means for signalling an acknowledgement from the processor to the requesting channel;

page array means including for each said channel a separate second address register for storing a N-M bit page address; and means gating means within said DMA control means responsive to operation of said request signaling means relative to an identified one of said channels, and a corresponding operation of said acknowledgement signalling means, for gating an M-bit partial address to the first portion of said address bus, from the first address register assigned to the identified channel, and an N-M bit page address to the second portion of the address bus, from the second address register assigned to said identified channel.

3. The method of operating computing apparatus, including a processor, a memory, a plurality of peripheral devices, and a direct memory access (DMA) controller having a plurality of concurrently operable DMA channels assignable to interface between said memory and devices, to enable said channels to operate concurrently relative to either the same or different page address spaces of said memory for transferring data concurrently between said spaces and said devices, said apparatus also including a system bus including an address bus capable of manifesting a plurality N of address bits and a data bus; said DMA controller including means individual to said channels for storing partial addresses consisting of M address bits, where M<N, on behalf of respective channels; the method comprising the steps of:

alterably storing a plurality of N-M bit page addresses relative to individual said channels in an array of registers dedicated to said channels;

responsive to a request from one of said channels to said processor in behalf of one of said peripheral devices, accompanied by signals indicating the identity of that channel, establishing control of the system bus in the DMA controller, responsive to said request signalling an acknowledgement from the processor to the requesting channel;

in response to said acknowledgement signal, loading onto the address bus from the DMA controller the M-bit partial address stored by the controller on behalf of said requesting channel; and in response to said acknowledgement signal, selecting the N-M bit page address corresponding to the requesting channel, from said array of dedicated registers, and gating respective page address signals out to the address bus for designating thereby in combination with the partial address loaded onto said bus an address location within a page address space in said memory currently allocated to said requesting channel.

4. The method of claim 3, further comprising:

transferring information from said processor to said DMA controller representing an M-bit partial addresses together with command signals indicating one of said channels;

responsive to said command signals storing the accompanying partial address information in said DMA controller partial address storing means in association with said one channel;

transferring an N-M bit page address from said processor to said page register array together with command signals designating said one channel;

responsive to the command signals accompanying said page address, storing said page address in the register in said array allocated to said one channel;

said M bit partial address and N-M bit page address together representing a location in said memory to be referenced by said one channel;

transferring from said processor to said DMA controller a count designating a number of data characters to be transferred between a device served by said one channel and said memory;

storing said count in said controller in association with said one channel;

during operation of said controller in behalf of said one channel, transferring said partial address and page address stored in association with said one channel to said address bus to address said reference location, and responsive thereto transferring a data character via the data bus between said reference location and said device served by said one channel;

thereupon incrementing said one channel's stored partial address and decrementing said count; and repeating said address and data transferring steps, using the incremented partial address value, and repeating said address incrementing and count decrementing steps until the value of said count as decremented is zero.

* * * * *